US012645098B2

(12) United States Patent
Ookubo et al.

(10) Patent No.: US 12,645,098 B2
(45) Date of Patent: Jun. 2, 2026

(54) MOLD MANUFACTURING METHOD, OPTICAL MEMBER MANUFACTURING METHOD, AND SPECTACLE LENS

(71) Applicant: HOYA LENS THAILAND LTD., Pathumthani (TH)

(72) Inventors: Shigeki Ookubo, Tokyo (JP); Takako Ishizaki, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 272 days.

(21) Appl. No.: 18/284,660

(22) PCT Filed: Mar. 11, 2022

(86) PCT No.: PCT/JP2022/011114
§ 371 (c)(1),
(2) Date: Sep. 28, 2023

(87) PCT Pub. No.: WO2022/209795
PCT Pub. Date: Oct. 6, 2022

(65) Prior Publication Data
US 2024/0160040 A1      May 16, 2024

(30) Foreign Application Priority Data

Mar. 31, 2021      (JP) ................................. 2021-059087

(51) Int. Cl.
*G02C 7/02*           (2006.01)
*B29C 33/38*          (2006.01)
(Continued)

(52) U.S. Cl.
CPC .......... *G02C 7/022* (2013.01); *B29C 33/3842* (2013.01); *B29C 33/424* (2013.01);
(Continued)

(58) Field of Classification Search
CPC ...... G02C 7/022; G02C 2202/24; G02C 7/06; B29C 33/3842; B29C 33/424;
(Continued)

(56) References Cited

U.S. PATENT DOCUMENTS 6,203,156 B1 *   3/2001   Wu .................... B29D 11/0048
                                                         351/159.69
11,884,032 B2 *   1/2024   Toyoshima ...... B29D 11/00326
(Continued)

FOREIGN PATENT DOCUMENTS

CN          102378677 A       3/2012
EP            3640712 A1       4/2020
(Continued)

OTHER PUBLICATIONS

Jan. 21, 2025 Partial Supplementary European Search Report issued in European Patent Application No. 22780016.6.
(Continued)

*Primary Examiner* — Dmitriy Bolotin
(74) *Attorney, Agent, or Firm* — Oliff PLC

(57)               ABSTRACT

There is provided a mold manufacturing method, including: preparing a glass mold formed of a glass material, as a molding mold for manufacturing an optical member having convex defocus portions on at least one of optical surfaces (S11); and irradiating a surface of the glass mold for forming the optical surface, with a short-pulse laser beam to form concave portions corresponding to the defocus portions (S12).

12 Claims, 4 Drawing Sheets

(51) Int. Cl.
B29C 33/42 (2006.01)
B29D 11/00 (2006.01)

(52) U.S. Cl.
CPC .... B29D 11/00336 (2013.01); B29D 11/0048 (2013.01); B29K 2909/08 (2013.01); B29K 2995/0031 (2013.01)

(58) Field of Classification Search
CPC ......... B29C 39/26; B29C 33/38; B29C 33/42; B29D 11/00336; B29D 11/0048; B29D 11/00009; B29D 11/00326; B29D 11/00932; B29D 11/00028; B29D 11/00355; B29K 2909/08; B29K 2995/0031; B29L 2011/0016; B23K 26/36
See application file for complete search history.

(56) References Cited

U.S. PATENT DOCUMENTS

| | | |
|---|---|---|
| 2003/0029849 A1 | 2/2003 | Trinks et al. |
| 2012/0140323 A1 | 6/2012 | Yajima et al. |
| 2017/0131567 A1 | 5/2017 | To et al. |
| 2017/0297283 A1 | 10/2017 | Van Heugten |
| 2019/0324293 A1 | 10/2019 | Marshall et al. |
| 2021/0387430 A1* | 12/2021 | Toyoshima ............. B29C 33/42 |
| 2022/0082864 A1 | 3/2022 | Qi et al. |

FOREIGN PATENT DOCUMENTS

| | | | |
|---|---|---|---|
| EP | 3730269 A1 * | 10/2020 | ............. G02B 1/041 |
| EP | 3730270 A1 | 10/2020 | |
| JP | H03109814 U | 11/1991 | |
| JP | 2009-241369 A | 10/2009 | |
| JP | 2012-189677 A | 10/2012 | |
| JP | 2014-051041 A | 3/2014 | |
| JP | 2016-107598 A | 6/2016 | |
| JP | 2018504302 A | 2/2018 | |
| JP | 2021-005081 A | 1/2021 | |
| WO | 2019124354 A1 | 6/2019 | |

OTHER PUBLICATIONS

Mar. 14, 2025 Search Report issued in European Patent Application No. 22780016.6.
PCT/JP2022/011114, "English Translation of International Search Report", May 10, 2022, 2 pages.
PCT/JP2022/011114, "International Preliminary Report on Patentability", Oct. 12, 2023, 6 pages.

* cited by examiner

MOLD MANUFACTURING METHOD, OPTICAL MEMBER MANUFACTURING METHOD, AND SPECTACLE LENS

CROSS-REFERENCE TO RELATED APPLICATIONS

This application is the National Stage of International Application No. PCT/JP2022/011114, filed Mar. 11, 2022, which claims priority to Japanese Patent Application No. 2021-059087, filed Mar. 31, 2021, and the contents of which is incorporated by reference.

TECHNICAL FIELD

The present disclosure relates to a mold manufacturing method, an optical member manufacturing method, and a spectacle lens.

DESCRIPTION OF RELATED ART

In recent years, as a spectacle lens for suppressing the progression of refractive error such as myopia, there is a spectacle lens in which convex defocus portions are formed on an object-side optical surface (see, for example, Patent document 1). Such a spectacle lens is manufactured by molding a resin material, and at this time, it is general to perform molding using a metal molding mold (die) (see Patent document 2, for example).

PRIOR ART DOCUMENT

Patent Document

[Patent Document 1] US Application Publication No. 2017/0131567
[Patent Document 2] International Publication No. 2019/124354

SUMMARY OF THE DISCLOSURE

Problem to be Solved by the Disclosure

It is desirable that the molding mold for a spectacle lens is capable of easily forming a spectacle lens even when an optical surface has a complicated shape, in consideration of a manufacturing cost of the spectacle lens. In addition, there are various types of resin materials that constitute the spectacle lens, depending on a difference in refractive index, etc., but any type is required to be appropriately moldable.

An object of the present disclosure is to provide a technique of manufacturing a molding mold capable of easily forming a spectacle lens even when an optical surface has a complicated shape, and compatible with various kinds of resin materials.

Means for Solving the Problem

A first aspect of the present disclosure provides a mold manufacturing method, including:
  preparing a glass mold formed of a glass material, as a molding mold for manufacturing an optical member having convex defocus portions on at least one of optical surfaces; and
  irradiating a surface of the glass mold for forming the optical surface, with a short-pulse laser beam to form concave portions corresponding to the defocus portions.

A second aspect of the present disclosure provides the mold manufacturing method according to the first aspect, wherein one of the concave portions is formed by multiple shots of the short-pulse laser beam, and a depth of forming the concave portion is controlled by an overlap between shots.

A third aspect of the present disclosure provides the mold manufacturing method according to the second aspect, wherein irradiation of the multiple shots is performed while changing an overlap amount so that the overlap amount between shots increases from an outer edge side toward a center side of the concave portion.

A fourth aspect of the present disclosure provides the mold manufacturing method according to any one of the first to third aspects, including:
  polishing the concave portions after being irradiated with the short-pulse laser beam, to adjust a surface shape of the concave portions.

A fifth aspect of the present disclosure provides an optical member manufacturing method, including:
  molding a resin material using the molding mold obtained by the optical member mold manufacturing method according to any one of the first to fourth aspects, to manufacture an optical member having defocus portions on at least one of optical surface.

A sixth aspect of the present disclosure provides the optical member manufacturing method according to the fifth aspect, wherein a material having a refractive index of 1.40 or more is used as the resin material.

A seventh aspect of the present disclosure provides the optical member manufacturing method according to claim 5 or 6, wherein a spectacle lens is manufactured as the optical member, having base regions where a transmitted light is focused at a predetermined position within an eye, and defocus regions where the transmitted light is focused at a position defocused from the predetermined position by the defocus portions.

An eighth aspect of the present disclosure provides a spectacle lens having optical surfaces on an object side and an eyeball side respectively, the spectacle lens including:
  defocus regions where defocus portions are formed, and base regions where the defocus portions are not formed, on at least one of the optical surfaces,
  wherein the defocus portions are formed at a plurality of locations, and when the defocus portions have a shape of X-fold rotational symmetry and an arrangement of the defocus portions is Y-fold rotational symmetry, both X and Y are multiples of 3 or both X and Y are multiples of 4.

A nineth aspect or the present disclosure provides the spectacle lens according to the eighth aspect, wherein a position where a light beam passing through the spectacle lens is focused by the base regions, and a position where the light beam passing through the spectacle lens is focused by the defocus portions are different from each other.

Advantage of the Disclosure

According to the present disclosure, there is provided a technique of manufacturing a molding mold capable of easily forming a spectacle lens even when an optical surface has a complicated shape, and compatible with various kinds of resin materials.

DETAILED DESCRIPTION OF THE DISCLOSURE

Hereinafter, embodiments of the present disclosure will be described based on the drawings.

In this embodiment, the following description will be given, with a case where the optical member is a spectacle lens as an example.

(1) Configuration of Spectacle Lens

Figure 1:
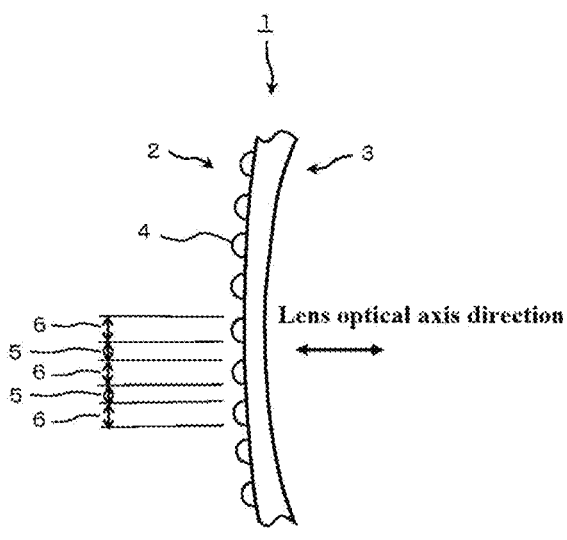
FIG. 1 is a side cross-sectional view showing a configuration example of a main part of a spectacle lens according to one embodiment of the present disclosure.

FIG. 1 is a side cross-sectional view showing a configuration example of a main part of a spectacle lens according to this embodiment.

The spectacle lens 1 has an object-side surface 2 and an eyeball-side surface 3 as optical surfaces. The object-side surface 2 is the surface positioned on the object side when a spectacle with the spectacle lenses 1 is worn by a wearer. The eyeball-side surface 3 is the opposite, ie the surface positioned on the eyeball-side when the spectacle with the spectacle lenses 1 is worn by the wearer.

Convex defocus portions 4 are formed on at least one of the object-side surface 2 and the eyeball-side surface 3, for example, on the object-side surface 2 in this embodiment. That is, the spectacle lens 1 is configured to have convex defocus portions 4 on at least one of the optical surfaces. Thereby, the spectacle lens 1 includes base regions 5 where the defocus portions 4 are not formed, and defocus regions 6 where the defocus portions 4 are formed. The defocus portions 4 are formed at a plurality of locations, resulting in the defocus regions 6 also existing sparsely at a plurality of locations.

The base regions 5 are the portions, each having a shape capable of realizing a wearer's prescribed refractive power. That is, the base regions 5 are the portions configured by a curved surface with a predetermined curvature (curve) according to the wearer's prescribed refractive power, so that light rays passing through the spectacle lens 1 are focused on a predetermined position within a wearer's eye, specifically, on the retina of the wearer. Accordingly, the base regions 5 are the portions, each having a shape designed based on wearer's prescription information. Then, the prescription information or a medium in which prescription information is recorded can be linked to the spectacle lens 1 and managed.

The defocus region 6 is a region at least a part of which the does not allow a base region 5 to converge the light rays to a converging position. That is, the defocus region 6 is a region constituted by the defocus portion 4, in which the light rays passing through the spectacle lens 1 are focused on a position defocused from a predetermined position, that is, on a position different from the retina of the wearer. For example, by giving a positive defocus to the defocus portion 4 and providing a converging spot for the light rays to focus on the front side of the wearer's retina, a stimulation received by the retina can be controlled and the progression of myopia can be suppressed. That is, a position where the light rays passing through the spectacle lens 1 are focused by the shape of the base region 5, and a position where the light rays are focused by the shape of the defocus portion 4, are configured to be different. For example, the position where the light rays are focused by the shape of the defocus portion 4 can be located on the front side (object side) of the position where the light rays are focused by the shape of the base region 5.

The defocus portion 4 that constitutes the defocus region 6 is formed to protrude from a constituent surface of the base region 5 toward the object side, and its protruded surface is formed by a curved surface with a curvature (curve) different from that of the constituent surface of the base region 5. Thereby, the light transmitted through the defocus portion 4 is focused on a position different from that on the wearer's retina. Accordingly, the defocus portion 4 is an optical element having a refractive power different from that of the base region 5. The curved surface constituting the defocus portion 4 (that is, the shape of the protruding surface of the defocus portion 4) is not particularly limited, and may be spherical, aspherical, toric, or a mixture thereof. For example, as the aspherical shape, the shape of the defocus portion 4 may be an aspherical surface having rotational symmetry, specifically, an X-rotational symmetry (X is 3 or 4). More specifically, the surface shape substantially includes an aspheric shape with 4-fold or more rotational symmetry. Among these, preferred examples include a 6-fold aspherical surface and an 8-fold aspherical surface. An upper limit is preferably 12-fold symmetry or less, more specifically, 10-fold symmetry or less. As the surface constituting the defocus portion 4, a surface including a plane, or a polyhedron may be acceptable, and the surface shape includes for example, a shape obtained by dividing a regular dodecahedron, a regular tetrasahedron, etc. into halves. These can also be included in the rotationally symmetric aspheric shape. Such a case also acceptable as long as having the above-described shapes. Also, the vertex and ridgeline portions may be rounded. As an example, this embodiment shows a case where the defocus portion 4 has a spherical shape. The diameter of the defocus portion 4 in plan view is, for example, 0.6 to 2.0 mm, and a protrusion height is, for example, 0.1 to 10 μm.

In this embodiment, a plurality of defocus portions 4 are regularly arranged on the optical surface (convex object-side surface in this embodiment) of the spectacle lens 1. However, an arrangement region on the optical surface is not particularly limited, and when the plurality of defocus portions 4 are arranged regularly, the defocus portions 4 may be arranged over an entire optical surface, or the defocus portions 4 may be partially arranged in a partial region on the optical surface, or a region in which the defocus portion 4 is not formed may be provided in the center of the lens, and so as to surround this region, the defocus portions 4 may be arranged in a circumferential region.

The plurality of defocus portions 4 are arranged in independent islands (that is, separated from each other without being adjacent to each other). That is, in this embodiment, each of the defocus portions 4 is arranged sparsely (that is, in a state in which they are not continuous and scattered separately). However, this embodiment shows a case where all of the defocus portions 4 are independent islands. However, the arrangement of the defocus portions 4 is not necessarily limited to this embodiment, and it is acceptable to provide a region in which each defocus portion 4 is arranged such that outer edges of adjacent defocus portions 4 are connected to each other, or are in contact with each other.

A large number (for example, about 200 to 600, more specifically about 300 to 500) of defocus portions 4 can be provided on the optical surface. When at least some of these are arranged regularly, the arrangement can be made to be Y-fold symmetry (where Y is a multiple of 3 or 4). For example, the arrangement of 3-fold symmetry means that an arrangement state in which a large number of defocus portions 4 are arranged, is a 3-fold rotational symmetry.

Further, it is acceptable to design so that there is a correlation between the shape of each defocus portion 4 and the arrangement of the plurality of defocus portions 4. For example, when the shape of the defocus portion 4 is X-fold rotational symmetry and the arrangement is Y-fold rotational symmetry, examples include the case where both X and Y are multiples of 3, or the case where both X and Y are multiples of 4. Specifically, preferable arrangement is the case where both X and Y are 6 or the case where both are 4. An optical behavior of the spectacle lens 1 is advantageous when such a correlation regularity is satisfied. That is, even when an image on the retina of the wearer is blurred, the blurring is rotationally symmetric, so that the wearer is less likely to feel discomfort. A blurred image without regularity is easily recognized by the wearer, but a blurred image with regularity, particularly rotational symmetry, is difficult to be recognized and is less likely to cause discomfort or fatigue to the wearer.

Figure 2:
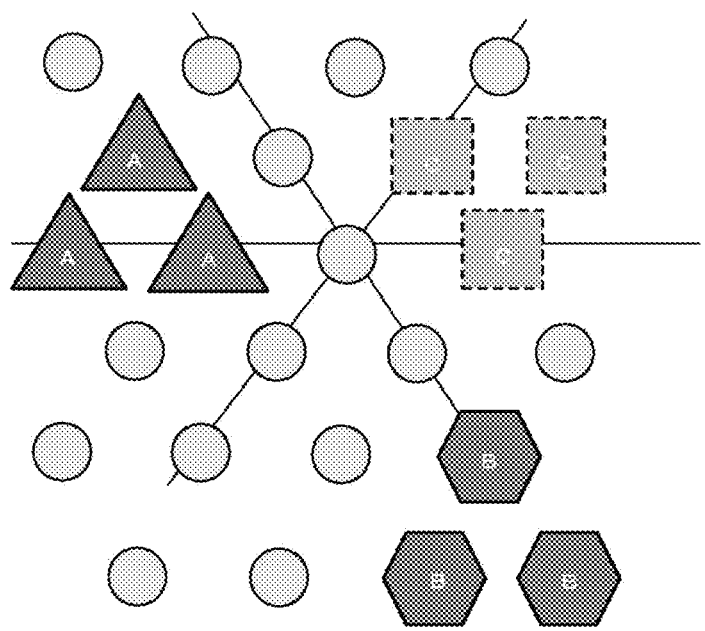
FIG. 2 is an explanatory view (part 1) schematically showing an arrangement example of defocus portions in the spectacle lens according to one embodiment of the present disclosure, and is a view showing an example of a 6-fold symmetric arrangement.
Figure 3:
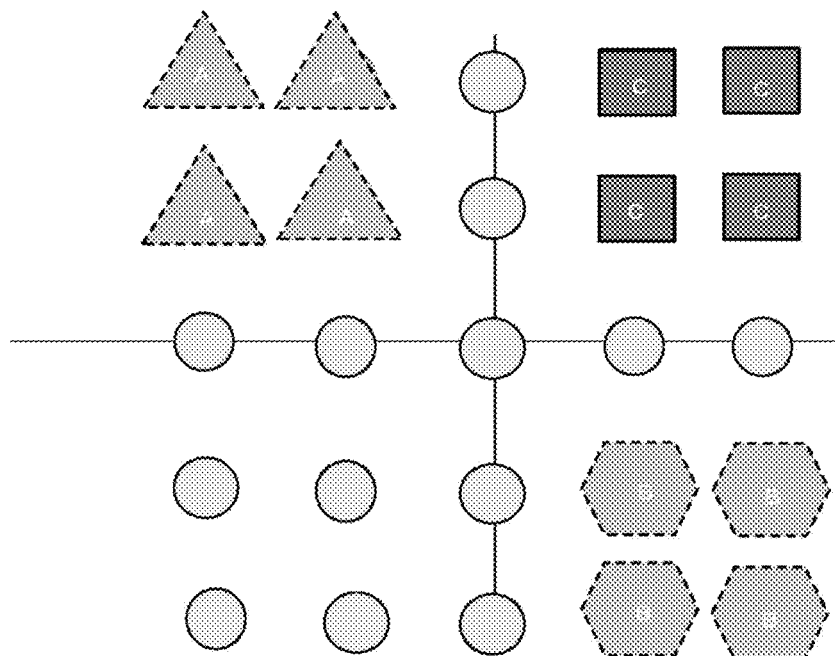
FIG. 3 is an explanatory view (part 2) schematically showing an arrangement example of defocus portions in the spectacle lens according to one embodiment of the present disclosure, and is a view showing an example of a 4-fold symmetric arrangement.

FIGS. 2 and 3 are explanatory views schematically showing examples of the arrangement of defocus portions.

For example, as shown in FIG. 2, when the defocus portions 4 (see A in the figure) having a 3-fold symmetric three-dimensional shape (for example, a triangle) is arranged in a 3-fold (or 6-fold) symmetric arrangement, this is a preferred embodiment because the symmetry is not impaired. The same applies to the defocus portions 4 (see B in the figure) having a three-dimensional shape (eg, hexagon) with 6-fold symmetry. However, regarding the defocus portions 4 (see C in the figure) having a three-dimensional shape with 4-fold symmetry (for example, a square), the symmetry may be impaired when the arrangement is a 3-fold (or 6-fold) symmetrical arrangement.

Further, for example, as shown in FIG. 3, when the defocus portions 4 (see C in the figure) having a three-dimensional shape with 4-fold symmetry (for example, a rectangle) is arranged in a 4-fold symmetry arrangement, this is a preferred embodiment because the symmetry is not impaired. However, regarding the defocus portions 4 (see A in the figure) having a 3-fold symmetrical three-dimensional shape (for example, a triangle) or the defocus portions 4 (see B in the figure) having a 6-fold symmetrical three-dimensional shape (for example, a hexagon), the symmetry may be impaired when the arrangement is a 4-fold symmetric arrangement.

Examples of the spectacle lens 1 configured as above include a refractive error progression suppressing lens that suppresses the progression of refractive error in the eye of a spectacle wearer, particularly a myopia progression suppressing lens that suppresses the progression of myopia. The myopia progression suppressing lens allows the light rays transmitted through the base region 5 to be converged to the wearer's retina, while allowing the light rays transmitted through the defocus region 6 to be converged to a position closer to the object side than the retina. That is, the myopia progression suppressing lens has a function of converging light rays to a position closer to the object side, separately from a light beam convergence function for realizing a wearer's prescription. By having such an optical property, the myopia progression suppressing lens can exert an effect of suppressing the progression of refractive error such as myopia of the wearer (hereinafter referred to as "myopia suppression effect").

A film may be formed on at least one of the object-side surface 2 (convex surface in this embodiment) and the eyeball-side surface 3 (concave surface in this embodiment) of the spectacle lens 1. Examples of the film include a hard coat film (HC film) and an antireflection film (AR film), but in addition to these, other films may be formed. These films may be realized using a known technique, and detailed description thereof is omitted here.

(2) Spectacle Lens Manufacturing Method

The spectacle lens 1 having the configuration described above is manufactured through the following procedure. Specifically, the spectacle lens 1 is manufactured through a substrate forming step and, if necessary, a film forming step.

The substrate forming step is a step of forming a lens substrate to be the spectacle lens 1 by cast-molding a resin material, using a molding mold.

The lens substrate formed here has convex defocus portions 4 on at least one of the optical surfaces. In order to form such a lens substrate, a molding mold is used, in which concave portions corresponding to the defocus portions 4 are formed on its surface for forming the optical surface. Details of the molding mold will be described later.

Resin comprising various kinds of raw materials can be used as the resin material for forming the lens substrate.

Specific examples of the resin material include polycarbonate resins, urethane urea resins, (thio)urethane resins, polysulfide resins, polyamide resins, polyester resins, acrylallyl resins, styrene resins including (meth)acrylic resins, allyl carbonate resins such as diethylene glycol bis(allyl carbonate) resins(CR-39), vinyl resins, and polyether resins. Among these resins, polycarbonate resin (thermoplastic resin) has a short solidification time in a mold (for example, 10 minutes or less), and therefore has high production efficiency, ie, is advantageous in terms of a production cost. (Thio)urethane resin means at least one selected from thiourethane resin obtained by reacting an isocyanate compound with a polythiol compound, and urethane resin obtained by reacting an isocyanate compound with a hydroxy compound such as diethylene glycol. Among these resins, (thio)urethane resin and polysulfide resin are preferred. These resins have an advantage of obtaining a spectacle lens with a high refractive index (e.g. 1.6 or higher). Further, for example, a cured product (generally called a transparent resin) obtained by curing a curable composition containing a (thio)epoxy compound having one or more disulfide bonds in a molecule may also be used. The curable composition may also be referred to as a polymerizable composition. Also, the resin material may be undyed (colorless lens) or dyed (dyed lens). As for the thermosetting resins, including the (thio)urethane resin, it takes a long time to molding (for example, about 10 to 20 hours) and molding occupancy time is long. Therefore, it is efficient to use multiple molds for production. Accordingly, the glass mold, which is relatively inexpensive and easy to manufacture, can be advantageously used.

Further, as a resin material for forming the lens substrate, for example, a resin material having a refractive index (nD) of approximately 1.40 or more and 1.74 or less is used. However, the refractive index is not limited to this range, and may be within this range or vertically apart from this range. In the present disclosure and this specification, the refractive index refers to the refractive index for light with a wavelength of 500 nm.

Even within the range described above, it is particularly preferable that the refractive index is as follows. That is, the lens substrate formed of a resin material preferably has a refractive index of 1.50 or more, and more preferably has a so-called high refractive index of 1.60 or more.

Preferred commercially available lens substrates include allyl carbonate plastic lens "HILUX 1.50" (manufactured by HOYA Corporation, refractive index 1.50), thiourethane plastic lens "MERIA" (manufactured by HOYA Corporation, refractive index 1.50), thiourethane plastic lens "EYAS" (manufactured by HOYA Corporation, refractive index 1.60), thiourethane plastic lens "EYNOA" (manufactured by HOYA Corporation, refractive index 1.67), polysulfide plastic lens "EYRY" (manufactured by HOYA Corporation, refractive index 1.70), polysulfide plastic lens "EYVIA" (manufactured by HOYA Corporation, refractive index 1.74), etc.

Cast molding may be performed using a known technique, so detailed description is omitted here.

The film forming step is a step of forming a film such as an HC film or an AR film on at least one of the surfaces (preferably both main surfaces) of the lens substrate obtained in the substrate forming step.

The HC film is formed using, for example, a curable material containing a silicon compound, and is a film having a thickness of about 3 μm to 4 μm. The HC film has a refractive index (nD) close to the refractive index of the lens substrate material described above, for example, about 1.49 to 1.74, with its film structure selected according to the material of the lens substrate. By coating with such an HC film, the durability of the spectacle lens can be improved. The HC film may be formed, for example, by a dipping method using a solution in which a curable material containing a silicon compound is dissolved.

The AR film has a multi-layered structure in which films with different refractive indices are laminated, and is a film that prevents a reflection of light by an interference effect. Specifically, the AR film has a multi-layered structure in which a low refractive index layer and a high refractive index layer are laminated. The low refractive index layer comprises silicon dioxide ($SiO_2$) having a refractive index of about 1.43 to 1.47, for example. Further, the high refractive index layer comprises a material having a higher refractive index than the low refractive index layer, and for example, zirconium oxide ($ZrO_2$), tin oxide ($SnO_2$), niobium oxide ($Nb_2O_5$), tantalum oxide ($Ta_2O_5$), titanium oxide ($TiO_2$), yttrium oxide ($Y_2O_3$), aluminum oxide ($Al_2O_3$), a mixtures thereof (e.g. oxide indium tin (ITO)), etc., are used to constitute the high refractive index layer. However, an outermost layer of the multi-layered AR film is always configured to be the low refractive index layer (for example, a $SiO_2$ layer). By coating with such an AR film, the visibility of an image seen through a spectacle lens is improved. The AR film may be formed by applying ion-assisted vapor deposition, for example.

By going through the steps described above, the spectacle lens 1 having the configuration described above is manufactured.

(3) Mold Manufacturing Method

Next, the method for manufacturing a molding mold used in the substrate forming step will be described.

As described above, there are various types of resin materials for forming the lens substrate, depending on a difference in refractive index, composition, etc. Therefore, in the substrate forming step, it is required to appropriately perform cast molding using the molding mold regardless of the type of the resin material. However, when using a metal mold (mold) as the molding mold, there is a concern that the resin material is limited to polycarbonate resin due to a manufacturing problem. Specifically, for example, thermoplastic polycarbonate resin can be molded in a short period of time by injection molding, and can be used for mass production of the lens substrate, with no need for preparing a large number of expensive metal molds. However, the resin material other than polycarbonate resin is polymerization type (thermosetting) and it takes time to react, so the mold occupancy time is long, and when mass production of the lens substrate is attempted, it is required to prepare a large number of expensive metal molds. Particularly, a metal mold having a transfer surface for forming fine and precise convex portions on a lens substrate material is expensive, due to not easy manufacturing. Accordingly, when the metal mold is used, the resin material tends to be limited to polycarbonate resin.

When the glass mold formed of a glass material is used as the molding mold, it is relatively easy to prepare a large number of molds compared to the metal mold. That is, by using the glass mold, the resin material is not limited to polycarbonate resin, and any kind of resin material can be used. However, as for the glass mold, since the glass material is brittle and difficult to work, workability is required to be taken into consideration. Particularly, for example, when the optical surface has a complicated shape, it is not always easy for a molding mold formed with concave portions corresponding to the defocus portions 4, to form such a complicated shape with high precision, and it is not desirable to require complicated processing for forming the complicated shape. That is, it is desirable that the molding mold for a spectacle lens is capable of easily forming a spectacle lens even when an optical surface has a complicated shape, in consideration of a manufacturing cost of the spectacle lens.

Figure 4:
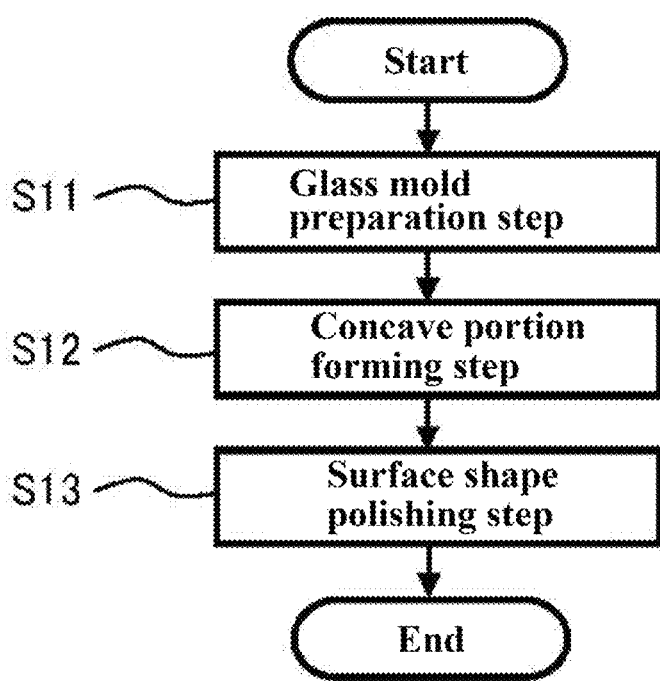
FIG. 4 is a flow chart showing an example of a procedure of a mold manufacturing method according to one embodiment of the present disclosure.

In view of the above, in this embodiment, the molding mold is manufactured through the following procedure. FIG. 4 is a flowchart showing an example of the procedure of the mold manufacturing method according to this embodiment. As shown in the figure, in the present embodiment, the molding mold for forming the spectacle lens 1 is manufactured through at least a glass mold preparation step, a concave portion forming step (S12), and a surface shape polishing step (S13).

In the glass mold preparation step (S11), a glass mold formed of a glass material is prepared as a molding mold for manufacturing the spectacle lens 1. The glass mold prepared here has a surface shape that is not compatible with the formation of the defocus portions 4. That is, the glass mold is prepared, having a surface shape for forming the object-side surface 2 and for forming the eyeball-side surface 3 respectively. For forming the object-side surface 2, the glass mold having a surface shape in the case of no presence of the defocus portions 4 (that is, a surface shape compatible with the formation of the base regions 5) is prepared. The surface shape of the base region 5 can be determined based on the prescription information regarding a wearer. When the surface shape is compatible with the formation of the base regions 5, the glass mold without requiring complicated processing can be realized.

Next, in the concave portion forming step (S12), regarding the surface of the prepared glass mold for forming the optical surface, the surface having a planar shape corresponding to the formation of the base regions 5 is irradiated with a short-pulse laser beam to form concave portions thereon corresponding to the defocus portions 4.

The short-pulse laser beam referred to here can be a laser with a pulse width of less than 1 nanosecond. Specifically, the short-pulse laser, for example, refers to the laser beam having a pulse width of 0.1 picoseconds or more and less than 100 picoseconds, preferably, the pulse width of 0.1 picoseconds or more and 30 picoseconds or less, more preferably the pulse width of 0.1 picoseconds or more and 15 picoseconds or less. A lower limit of the pulse width is not particularly limited as long as it exceeds 0 femtoseconds, but as described above, for example, the laser beam having a pulse width of 0.1 picoseconds or more (including 1 picoseconds or more) can be preferably used.

The wavelength of the short-pulse laser beam is, for example, THG (Third Harmonic Generation) of 355 nm or SHG (Second Harmonic Generation) of 532 nm. However, the wavelength is not limited thereto, and may be, for example, a fundamental wavelength of 1064 nm or FHG (Forth Harmonic Generation) of 266 nm. The pulse energy of the short-pulse laser beam is, for example, 0.1 µJ or more and 30 µJ or less (up to about 60 µJ) at 50 kHz. The beam diameter of the short-pulse laser beam is, for example, 10 µm or more and 30 µm or less.

Since the pulse width is within the above range, the short-pulse laser beam is used for performing non-heating processing.

The non-heating processing is also called ablation processing, for example, and is a technique of performing processing without heating, by a multiphoton absorption phenomenon of the short-pulse laser beam. More specifically, the non-heating processing means a removal processing performed by minimizing an effect of heat around a processing area and instantly melting, evaporating, and scattering a melted part irradiated with short-pulse laser beam, even for a material that can only be melted at an extremely high temperature under atmospheric pressure. According to such non-heating processing, the melted part is instantly evaporated, scattered and removed, thereby enabling to perform processing with less thermal damage (deformation due to heat, etc.) due to less thermal influence on the periphery of a processed area.

That is, by using the short-pulse laser beam, oscillation ends before the thermal effect is transmitted, so non-heating processing with almost no thermal effect is realized. Accordingly, even in the case of the glass mold formed of a glass material that is difficult to be processed, the concave portions can be formed by performing partial removal processing by irradiation of the short-pulse laser beam.

Irradiation of the short-pulse laser beam is performed, for example, in a pulse split mode. The pulse split mode is a mode in which one pulse of the short-pulse laser beam is emitted (shot) to one position, and the irradiation position of each shot is moved two-dimensionally or three-dimensionally by using a galvanometer scanner, etc.

With such a pulse split mode, the concave portions corresponding to the defocus portions 4 and having a diameter of, for example, 0.6 to 2.0 mm in a planar view can be formed, even when the beam diameter of the short-pulse laser beam is, for example, 10 µm or more and 30 µm or less.

That is, when forming the concave portions, one concave portion is formed by multiple shots of the short-pulse laser beam.

Here, the multiple shots of the short-pulse laser beam will be specifically described.

Figure 5:
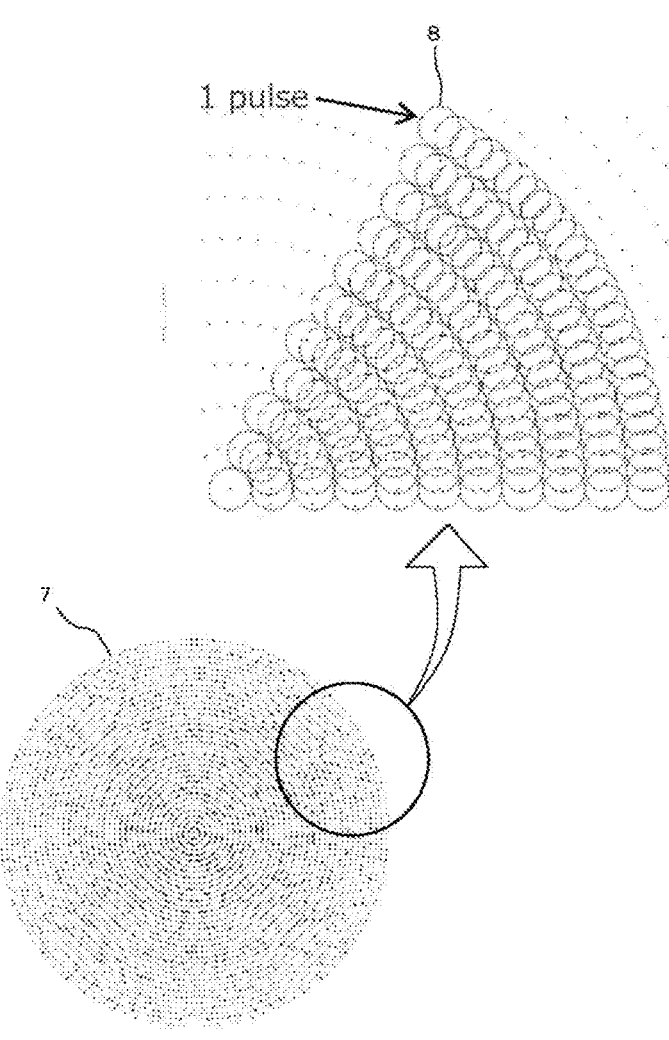
FIG. 5 is an explanatory view showing an arrangement example of multiple shots of a short-pulse laser beam in the mold manufacturing method according to one embodiment of the present disclosure.

FIG. 5 is an explanatory view showing an arrangement example of the multiple shots of the short-pulse laser beam in the mold manufacturing method according to the present embodiment.

In the example of the figure, when forming the concave portion 7 that is circular in plan view, multiple shots 8 of the short-pulse laser beam are arranged in a circle to form a shot row, and a plurality of shot rows with different circumference diameters are arranged concentrically. Here, the size (diameter) of each individual shot is the same. Further, the center of the concentric circles formed by the shot rows may correspond to the optical center of the spectacle lens 1 to be obtained.

In such an arrangement example of the multiple shots 8, the shots 8 forming the circumferential shot row are arranged so that the adjacent shots 8 overlap each other. Since the overlapping portion between shots 8 is repeatedly irradiated with the short-pulse laser beam, an amount of irradiation energy can be increased, and a processing depth by the non-heating processing can be large, compared to a single shot without overlap. This means that the depth of forming the concave portion 7 can be controlled by the overlap of each shot 8. For example, when the depth of forming the concave portion 7 is to be increased (deepened), the overlap amount between shots 8 may be increased, and when the depth of forming the concave portion 7 is to be decreased (shallowed), the overlap amount between shots 8 may be reduced, or the overlap may be eliminated.

Specifically, as in the present embodiment, when the defocus portion 4 has a spherical shape, and the concave portion 7 corresponding to this spherical concave portion 7 is formed, irradiation of each shot 8 may be performed, while changing the overlap amount so that the overlap amount between shots 8 increases from the outer edge side toward the center side of the concave portion 7. That is, on the outer edge side of the concave portion 7, the overlap amount between shots 8 is reduced or they are not allowed to overlap each other, and the arrangement pitch of each shot 8 is gradually narrowed toward the center of the concave portion 7, to thereby increase the overlap amount. In this way, the depth of forming the concave portion 7 is gradually increased (deepened) from the outer edge side toward the center side of the concave portion 7, and as a result, the spherical concave portion 7 can be formed.

FIG. 5 shows an arrangement example of the shots 8, showing a case that in making the shots 8 denser toward the center side of the concave portion 7, the concave portion 7 is overlapped in a circumferential direction (a direction along a circumferential shot row), but is not overlapped in a radial direction of the concave portion 7. However, the arrangement of the shots is not limited thereto. Each shot 8 may overlap both circumferentially and radially. Further, depending on the surface shape of the concave portion 7 to be formed, the manner in which the shots 8 are overlapped may be appropriately set, and is not limited to a specific manner.

Further, the arrangement example herein shows the case where the depth of forming the concave portion 7 is controlled by the overlap between shots 8, but the present disclosure is not necessarily limited thereto. For example, the depth, shape, etc., of the concave portion 7 can also be controlled by adjusting a laser power, frequency, number of shots, number of times, etc., of each shot 8. However, in this case, the control of each shot 8 may become complicated. Therefore, it is preferable to control the depth of forming the concave portion 7 by controlling the overlap amount by controlling the position of each shot 8.

In the concave portion forming step (S12), the irradiation of the short-pulse laser beam as described above is sequentially performed on a plurality of locations where the concave portion 7 is to be formed. Thereby, a plurality of concave portions 7 for forming the defocus portions 4 are formed in the glass mold. 200 to 600, more specifically 300 to 500 concave portions 7 for forming the defocus portions 4 can be provided on a molding surface of the glass mold. About 5 to 15 rows of shots forming the concentric circles can be provided.

Thereafter, the surface shape polishing step (S13) is performed. In the surface shape polishing step (S13), the concave portion 7 after being irradiated with the short-pulse laser beam, is polished to adjust the surface shape of the concave portion 7. Specifically, for example, a polishing agent such as cerium oxide is used to polish the surface to be processed in the concave portion forming step (S12), thereby smoothing a surface roughness of the surface to be processed.

Through such a surface shape polishing step (S13), the surface shape of the concave portion 7 can be adjusted without a concern about the influence of the surface roughness due to laser processing, even in a case of passing through the irradiation of short-pulse laser beam. Accordingly, such a glass mold is very suitable as a molding mold for forming the defocus portions 4.

Through the steps (S11 to S13) described above, the glass mold formed with concave portions 7 is obtained. Such a glass mold is used as a molding mold for manufacturing the spectacle lens 1 as described above. Specifically, such a glass mold is used for forming the object-side surface 2, and is arranged with a predetermined gap from the glass mold for forming the eyeball-side surface 3, and cast molding is performed by pouring a resin material between the respective molds, to thereby manufacture the spectacle lens 1 having defocus portions 4.

In that case, various kinds of resin materials can be used. That is, by using the glass mold formed of a glass material, any kind of resin material can be appropriately cast-molded. Accordingly, any kind of resin material having a refractive index of 1.40 or more and 1.74 or less can be used as the resin material. Also, a high refractive index material with a refractive index of preferably 1.50 or more, more preferably 1.60 or more can be used. Therefore, the cast molding can be appropriately performed in any case of the above.

(4) Effects of this Embodiment

According to this embodiment, one or more of the following effects are obtained.

(a) In this embodiment, the glass mold formed of a glass material is prepared as a molding mold for manufacturing the spectacle lens 1 having defocus portions 4. Then, concave portions 7 corresponding to the defocus portions 4 are formed by irradiation of the short-pulse laser beam onto the surface of the glass mold for forming the optical surface. Thus, by using the short-pulse laser beam, even with a glass mold formed of a glass material that is difficult to process, the concave portions can be easily formed without requiring complicated processing. Further, by using the glass mold, any kind of resin material can be appropriately cast-molded.

Therefore, according to this embodiment, the molding mold used for forming the optical surface can be easily obtained even when the optical surface to be formed has a complicated shape, and in addition, the molding mold is compatible with various kinds of resin materials.

(b) In this embodiment, a single concave portion 7 is formed by multiple shots 8 of the short-pulse laser beam, and the depth of forming the concave portion 7 is controlled by overlap between the shots 8. Accordingly, it is easy to cope with the formation of the concave portion 7 having a complicated three-dimensional shape. Further, the overlap amount can be controlled by controlling the position of each shot 8, and there is no need for variable control of the energy amount per shot. Therefore, control of each shot 8 being complicated can be suppressed, and a damage to the processed portion can also be suppressed.

(c) In this embodiment, irradiation of the multiple shots 8 is performed, while changing the overlap amount so that the overlap amount between shots 8 increases from the outer edge side to the center side of the concave portion 7. Accordingly, gradual increase (deepening) of the depth of forming the concave portion 7 from the outer edge side toward the center side of the concave portion 7 is easily realized, which is very useful for forming a substantially spherical concave portion 7.

(d) In this embodiment, the concave portion 7 after being irradiated with the short-pulse laser beam, is polished to adjust its surface shape. Accordingly, the surface shape of the concave portion 7 can be adjusted, without a concern about the influence of the surface roughness due to laser processing, even in the case of passing through the irradiation of short-pulse laser beam. Accordingly, such a glass mold is very suitable as a molding mold for forming defocus portions 4.

(e) In this embodiment, the resin material is molded using a glass mold having concave portions 7 as a molding mold, thereby manufacturing the spectacle lens 1 having defocus portions 4 on at least one of the optical surfaces. Accordingly, even in the case of having defocus portions 4, the spectacle lens 1 can be manufactured from various kinds of resin materials by using the glass mold. Particularly, even in the case of a high refractive index material that is difficult to mold with a metal molding mold (molding die), the spectacle lens 1 having defocus portions 4 can be manufactured using such a high refractive index material.

(5) Modified Example, Etc

The embodiments of the present disclosure have been described above. However, the above disclosure presents exemplary embodiments of the present disclosure. That is, the technical scope of the present disclosure is not limited to the exemplary embodiments described above, and various modifications can be made without departing from the scope of the disclosure.

As an example, the above-described embodiment shows the case of manufacturing the spectacle lens 1 having defocus portions 4 on the object-side surface 2, but the present disclosure is not limited thereto. That is, the defocus portions 4 may be formed on the eyeball-side surface 3 or may be formed on both the object-side surface 2 and the eyeball-side surface 3, as long as they are formed on at least one of the optical surfaces.

As an example, the above-described embodiment shows the case where the spectacle lens 1 having defocus portions 4 is a myopia progression suppressing lens, but the present disclosure is not limited thereto. That is, as long as the spectacle lens 1 has convex defocus portions 4 on at least one of the optical surfaces, it can be applied in exactly the same way even for purposes other than exhibiting the effect of suppressing myopia.

As an example, the above-described embodiment shows the case where the optical member is a spectacle lens, but the present disclosure is not limited thereto. That is, the present disclosure can be applied to the optical member other than the spectacle lens in exactly the same way.

DESCRIPTION OF SIGNS AND NUMERALS

1 . . . Spectacle lens (optical member)
2 . . . Object side surface (optical surface)
3 . . . Eyeball side surface (optical surface)
4 . . . Defocus portion
5 . . . Base region
6 . . . Defocus region
7 . . . Concave portion
8 . . . Shot

The invention claimed is:

1. A mold manufacturing method, comprising:
preparing a glass mold formed of a glass material, as a molding mold for manufacturing an optical member having convex defocus portions on at least one of optical surfaces; and
irradiating a surface of the glass mold for forming the optical surface, with a short-pulse laser beam to form concave portions corresponding to the defocus portions,
wherein one of the concave portions is formed by multiple shots of the short-pulse laser beam, and a depth of forming the concave portion is controlled by an overlap between shots.

2. The mold manufacturing method according to claim 1, wherein irradiation of the multiple shots is performed while changing an overlap amount so that the overlap amount between shots increases from an outer edge side toward a center side of the concave portion.

3. The mold manufacturing method according to claim 2, comprising:
polishing the concave portions after being irradiated with the short-pulse laser beam, to adjust a surface shape of the concave portions.

4. An optical member manufacturing method, comprising:
molding a resin material using the molding mold obtained by the optical member mold manufacturing method according to claim 2, to manufacture an optical member having defocus portions on at least one of optical surfaces.

5. The mold manufacturing method according to claim 1, comprising:

polishing the concave portions after being irradiated with the short-pulse laser beam, to adjust a surface shape of the concave portions.

6. An optical member manufacturing method, comprising:
molding a resin material using the molding mold obtained by the optical member mold manufacturing method according to claim 5, to manufacture an optical member having defocus portions on at least one of optical surfaces.

7. An optical member manufacturing method, comprising:
molding a resin material using the molding mold obtained by the optical member mold manufacturing method according to claim 1, to manufacture an optical member having defocus portions on at least one of optical surfaces.

8. The optical member manufacturing method according to claim 7, wherein a material having a refractive index of 1.40 or more is used as the resin material.

9. The optical member manufacturing method according to claim 8, wherein spectacle lens is manufactured as the optical member, having base regions where a transmitted light is focused at a predetermined position within an eye, and defocus regions where the transmitted light is focused at a position defocused from the predetermined position by the defocus portions.

10. The optical member manufacturing method according to claim 7, wherein a spectacle lens is manufactured as the optical member, having base regions where a transmitted light is focused at a predetermined position within an eye, and defocus regions where the transmitted light is focused at a position defocused from the predetermined position by the defocus portions.

11. A spectacle lens having optical surfaces on an object side and an eyeball side respectively, the spectacle lens comprising:
defocus regions where defocus portions are formed, and base regions where the defocus portions are not formed, on at least one of the optical surfaces,
wherein the defocus portions are formed at a plurality of locations, and when the defocus portions have a shape of X-fold rotational symmetry and an arrangement of the defocus portions is Y-fold rotational symmetry, both X and Y are multiples of 3 or both X and Y are multiples of 4.

12. The spectacle lens according to claim 11, wherein a position where a light beam passing through the spectacle lens is focused by the base regions, and a position where the light beam passing through the spectacle lens is focused by the defocus portions are different from each other.

* * * * *